United States Patent
Gou et al.

(10) Patent No.: US 8,982,872 B2
(45) Date of Patent: Mar. 17, 2015

(54) TRANSMITTING METHOD AND DEVICE FOR SCHEDULING INFORMATION

(75) Inventors: Wei Gou, Shenzhen (CN); Bin Wang, Shenzhen (CN); Feng Bi, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 430 days.

(21) Appl. No.: 13/125,937

(22) PCT Filed: Sep. 29, 2009

(86) PCT No.: PCT/CN2009/074324
§ 371 (c)(1),
(2), (4) Date: Apr. 25, 2011

(87) PCT Pub. No.: WO2010/051725
PCT Pub. Date: May 14, 2010

(65) Prior Publication Data
US 2011/0205952 A1 Aug. 25, 2011

(30) Foreign Application Priority Data
Nov. 7, 2008 (CN) .......................... 2008 1 0176055

(51) Int. Cl.
*H04J 3/06* (2006.01)
*H04W 72/12* (2009.01)
*H04L 12/861* (2013.01)
(Continued)

(52) U.S. Cl.
CPC .......... *H04W 72/1278* (2013.01); *H04L 12/189* (2013.01); *H04L 49/90* (2013.01); *H04W 72/005* (2013.01); *H04W 48/12* (2013.01)
USPC ........................................................ 370/350

(58) Field of Classification Search
CPC H04W 72/12–72/1294; H04W 74/002–74/06; H04W 72/00; H04W 7/40; H04W 4/06; H04W 72/005; H04I 2012/5679
USPC .................................................... 370/310–350
See application file for complete search history.

(56) References Cited

U.S. PATENT DOCUMENTS 6,256,509 B1 7/2001 Tanaka et al.
2004/0103435 A1* 5/2004 Yi et al. .......................... 725/81
(Continued)

FOREIGN PATENT DOCUMENTS

CN 1235437 A 11/1999
CN 1235437 C 11/1999
(Continued)

OTHER PUBLICATIONS

"Choice of SIBs for MBSFN subframe allocation signalling," R2-083537, TSG-RAN2#62bis, Warsaw; Jun. 30-Jul. 4, 2008, pp. 1-4.*
(Continued)

*Primary Examiner* — Andrew Chriss
*Assistant Examiner* — Kenan Cehic
(74) *Attorney, Agent, or Firm* — Locke Lord LLP; Howard M. Gitten

(57) ABSTRACT

A transmitting method and device for scheduling information, wherein the method includes: scheduling information of the MBMS controlling signaling is borne in a designated system information block to be transmitted, wherein the designated system information block is a system information block 2, a system information block 3, or a new added system information block.

8 Claims, 2 Drawing Sheets

(51) Int. Cl.
  *H04L 12/18* (2006.01)
  *H04W 72/00* (2009.01)
  *H04W 48/12* (2009.01)

(56) References Cited

U.S. PATENT DOCUMENTS

2007/0133456 A1   6/2007  Ding
2010/0022250 A1*  1/2010  Petrovic et al. ............... 455/450

FOREIGN PATENT DOCUMENTS

| CN | 1774124 A | 5/2006 |
|----|-----------|--------|
| CN | 1794827 A | 6/2006 |
| JP | 2005525065 A | 8/2005 |
| JP | 2008136151 A | 6/2008 |
| KR | 20050100802 A | 10/2005 |

OTHER PUBLICATIONS

International Search Report dated Dec. 24, 2009 (PCT/CN2009/074324); English language abstracts for CN 1794827 (A); CN 1235437 (A); and CN 1774124 (A).
International Search Report in international application No. PCT/CN2009/074324, mailed on Jan. 7, 2010.
English Translation of the Written Opinion of the International Search Authority in international application number: PCT/CN2009/074324 mailed on Jan. 7, 2010.
JP Communication dated Mar. 5, 2013.

\* cited by examiner

TRANSMITTING METHOD AND DEVICE FOR SCHEDULING INFORMATION

CROSS REFERENCES TO RELATED APPLICATIONS

This application is a U.S. national phase application pursuant to 35 U.S.C. §371, of PCT/CN2009/074324 filed on Sep. 29, 2009, which claims priority to Chinese Patent Application No. 200810176055.2 filed on Nov. 7, 2008. The entire contents of the aforementioned patent applications are incorporated herein by these references.

TECHNICAL FIELD

The present invention relates to the field of communications, and more particularly relates to a transmitting method and device for scheduling information.

BACKGROUND

With the rapid development of the Internet and the popularity of large screen multi-function mobile phones, there have been a large number of mobile data multimedia services and a variety of high bandwidth multimedia services, such as video conferencing, television broadcasting, video on demand, advertising, online education, interactive games, etc. The appearance of these services not only meets the increasing service requirement of mobile users, but also brings new service increasing points to mobile operators. These mobile data multimedia services require that multiple users can receive the same data simultaneously, and compared with ordinary data services, these mobile data multimedia services have features such as large amounts of data, long duration, and delay-sensitivity.

In order to utilize mobile network resources effectively, the $3^{rd}$ Generation Partnership Project (3GPP) presents a Multimedia Broadcast Multicast Service (MBMS). This service is a technology for transmitting data from one data source to multiple targets, which can effectively implement the sharing of network (including a core network and an access network) resources and improve the utilization of network resources (especially air interface resource). The MBMS defined by 3GPP can not only achieve low-speed message multicast and broadcast of the plain text, but also achieve high-speed broadcast and multicast of the multimedia services and provide a variety of rich video, audio, and multimedia services. This undoubtedly conforms to the development trend of future mobile data and provides better service prospect for the development of 3G.

The transmission modes of the MBMS services on an air interface can be divided into a dedicated carrier mode and a shared carrier mode. The main differences between these two transmission modes are: in the dedicated carrier mode, the carrier only bears the MBMS service; in the hybrid carrier mode, the carrier not only bears the MBMS services, but also bears non-MBMS services (such as unicast services). Wherein in the process of bearing the MBMS services by the hybrid carrier mode, there is the case that two kinds of services both use the identical carrier. How to reduce mutual interference between two kinds of services and maximize the effect in the process of transmitting services have always been the major topics discussed in the art.

In the process of bearing the MBMS services and the non-MBMS services by the hybrid carrier, multiplexing of two kinds of services is mainly based on a Frequency-Division Multiplexing (FDM) mode, a Time-Division Multiplexing (TDM) mode and the FDM/TDM hybrid multiplexing mode. Currently, the TDM is used as a primary multiplexing mode to carry on research in the art, so the TDM is used as a multiplexing mode of hybrid carrier MBMS services and non-MBMS services hereinafter.

Currently, subframes in a Long Term Evolution (LTE) system are divided into the subframes for bearing MBMS services and the subframes for bearing non-MBMS services. These subframes for bearing MBMS services are periodically configured, i.e. all of the subframes in a configuration period are divided into subframes for bearing MBMS services and subframes for bearing non-MBMS services. In these subframe resources to which MBMS services are allocated, there is information that how a receiver knows which service to be borne and when each service starts. Then how to bear these MBMS services in specific resources and which specific resources are used for bearing these MBMS services is one of contents described by MBMS controlling signaling (Multicast Control Channel, referred as MCCH, here the controlling signaling of MBMS services is borne in the MCCH, so the scheduling information of the controlling signaling is also the scheduling information of the MCCH). Recently, the controlling signaling of MBMS services preliminary prescribed in the LTE are divided into a primary multicast control signaling (Primary Multicast Control Channel, referred as Primary MCCH) and a secondary multicast control signaling (Secondary Multicast Control Channel, referred as Secondary MCCH), and the MBMS controlling signaling borne in an MCCH needs corresponding scheduling information to specify the resource position of the MCCH, so as to enable the receiver find out the MBMS controlling signaling borne in the MCCH at this position. The primary controlling signaling is mainly used for bearing cell-specific MBMS services, and the secondary controlling signaling is mainly used for bearing non cell-specific MBMS services.

There are no solutions for determining the position where the scheduling information should be borne to be transmitted to the receiver in the prior art. A Broadcast Control Channel (BCCH) is preferably selected. At present, the bearers on a BCCH in 3GPP protocol comprise: a Master Information Block (MIB) and SIB1~SIB11 (System Information Block, SIB). The problem is which specific bearer should be selected to be borne in, here each bearer has its own characteristic which is different from another, for example, the periods of most SIBs are different, the types of the contents borne in SIBs are different form each other, etc. For the problem that there are no definite solutions to select the bearers for bearing scheduling information of a primary and/or secondary MBMS controlling signaling or an MCCH, an effective solution has not been proposed yet.

SUMMARY

The present invention is proposed for the problem that there are no definite solutions to select the bearers for bearing the scheduling information of a primary and/or secondary MBMS controlling signaling or the scheduling information of an MCCH. Therefore the main purpose of the present invention is to provide a transmitting method and device for scheduling information to solve the above problem.

In order to achieve the above purpose, a transmitting method for scheduling information is provided according to one aspect of the present invention.

A transmitting method for scheduling information according to the present invention comprises: bearing the scheduling information of MBMS controlling signaling in a designated system information block to be transmitted, wherein the designated system information block is a system information block 2 (SIB2), a system information block 3 (SIB3), or a new added system information block.

Wherein said bearing the scheduling information in the designated system information block may comprise: bearing the scheduling information in the designated system information block as an independent information element; or bearing the scheduling information and MBMS resource configuration information in the designated system information block as one information element.

Specifically, after the scheduling information is mapped to the system information block 2 and before transmission is performed, the method may further comprise: mapping the system information block 2 to system information 2.

In addition, the new added system information block may be further used for bearing information related to the MBMS, wherein the related information may include at least one of the following: configuration information of indicating information for MBMS controlling information, MCCH repetition period information, MCCH modification period information, information of modulation mode adopted by an MCCH and encoding rate information.

Wherein when the designated system information block is a new added system information block, the new added system information block may be no longer sent in a cell if there are no MBMS services in the cell.

Wherein when the designated system information block is a new added system information block, the new added system information block and the SIB2 may be scheduled in the same SI sending time window or different SI sending time windows to be sent.

Wherein the SIB2 may be received by a receiver without ability of receiving MBMS service or a receiver with the ability of receiving the MBMS service but having no interests in MBMS service, but the receiver may be allowed not to receive the new added system information block.

Wherein the SIB2 may be received by a receiver with ability of receiving MBMS service and having interest in MBMS service, and the receiver may receive the new added system information block.

The above scheduling information of the controlling signaling may be scheduling information of a primary and/or secondary MBMS controlling signaling or the scheduling information of an MCCH, and the scheduling information may comprise the information for indicating the position of resource which bears controlling signaling, and the position information of the resource may be the information for indicating the position of a subframe which bears the primary and/or secondary MBMS controlling signaling or the MCCH.

Wherein when the designated system information block is a new added system information block, the scheduling information of the new added system information block may be included in a system information block 1 and is scheduled by the system information block 1.

Wherein when the designated system information block is a new added system information block, the new added system information block may bear MBMS information except for an information list of MBSFN-Subframe Configuration.

Wherein when the designated system information block is a new added system information block, a receiver receiving MBMS service may receive the MBMS-based new added system information block.

In order to achieve the above purpose, a transmitting device for scheduling information is provided according to the other aspect of the present invention.

A transmitting device for scheduling information according to the present invention comprises:

a bearing module, which is used for bearing the scheduling information of MBMS controlling signaling in a designated system information block to be transmitted, wherein the designated system information block is a system information block 2 (SIB2), a system information block 3 (SIB3), or a new added system information block; and a transmitting module, which is used for transmitting the system information block 2 which bears the scheduling information.

Wherein the bearing module may further comprise:

a first bearing submodule, which is used for bearing the scheduling information in the designated system information block as an independent information element; and a second bearing submodule, which is used for bearing the scheduling information and MBMS resource configuration information in the designated system information block as one information element.

The device may also further comprise:

a mapping module, which is used for mapping the system information block 2 which bears the scheduling information to system information 2.

Wherein the above new added system information block may be further used for bearing information related to the MBMS, wherein the related information may comprise at least one of the following: configuration information of indicating information for MBMS controlling information, MCCH repetition period information, MCCH modification period information, information of modulation mode adopted by an MCCH and encoding rate information.

Wherein when the designated system information block is a new added system information block, the new added system information block may be no longer sent in a cell if there are no MBMS services in the cell.

Wherein when the designated system information block is a new added system information block, the new added system information block and the SIB2 may be scheduled in the same SI sending time window or different SI sending time windows to be sent.

Wherein the SIB2 may be received by a receiver without ability of receiving MBMS service or a receiver with ability of receiving MBMS service but having no interests in MBMS service, but the receiver may be allowed not to receive the new added system information block.

Wherein the SIB2 may be received by a receiver with ability of receiving MBMS service and having interest in MBMS service, and the receiver may receive the new added system information block.

In addition, the above scheduling information of the controlling signaling may be the scheduling information of a primary and/or secondary MBMS controlling signaling or the scheduling information of an MCCH, the scheduling information may comprise the information for indicating the position of resource which bears controlling signaling, and the position information of the resource may be the information for indicating the position of a subframe which bears the primary and/or secondary MBMS controlling signaling or the MCCH.

Wherein when the designated system information block is a new added system information block, the scheduling information of the new added system information block may be included in a system information block 1 and is scheduled by the system information block 1.

Wherein when the designated system information block is a new added system information block, the new added system information block may bear MBMS information except for an information list of MBSFN-Subframe Configuration.

Wherein when the designated system information block is a new added system information block, a receiver receiving MBMS service may receive the MBMS-based new added system information block.

Through the above technical solution of the present invention, a proper bearer is selected according to the characteristics of bearers on a BCCH, to bear scheduling information of a primary and/or secondary MBMS controlling signaling, which fills the gap of the manner of selecting a bearer in related technologies and solves the problem that there are no definite solutions to select a bearer for bearing scheduling information of the primary and/or secondary MBMS controlling signaling or the scheduling information of the MCCH, thus realizing the configuration and sending of the scheduling information and reducing the receiving delay.

BRIEF DESCRIPTION OF THE DRAWINGS

The drawings illustrated here are provided for further understanding of the present invention, and constitute a part of the present invention. The illustrated embodiments of the present invention and descriptions thereof are used to explain the present invention, without constituting improperly limitations of the present invention, wherein.

DETAILED DESCRIPTION

Function Overview

Considering the problem that there are no definite solutions to select a bearer which bears scheduling information of a primary and/or secondary controlling signaling or an MCCH (the MBMS controlling signaling is borne on the MCCH when the MBMS controlling signaling is irrespective of the primary and secondary structures) in related technologies. By way of analyzing, in combination with the characteristics of the bearers, the present invention provides a reasonable manner to select a bearer and a manners of mapping within the bearers which bear scheduling information of the primary and/or secondary MBMS controlling signaling or the MCCH, which makes a base station (Node B) or an improved base station (eNode B) transmit the MBMS controlling signaling in a hybrid carrier system to a terminal and enables the receiver receive the transmitted information in time.

Embodiments Of The Present Invention

According to an embodiment of the present invention, a transmitting method for scheduling information is provided, which is used for transmitting scheduling information of MBMS controlling signaling.

Figure 1:
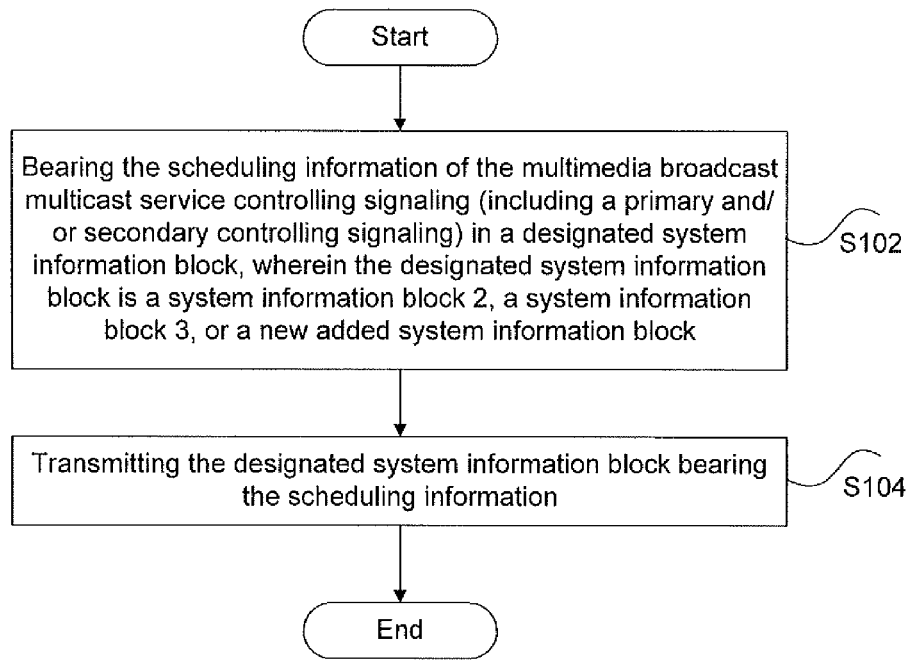
FIG. 1 is a flowchart illustrating a transmitting method for scheduling information according to an embodiment of the present invention.

FIG. 1 is a flowchart illustrating a transmitting method for scheduling information according to an embodiment of the present invention. As shown in FIG. 1, the method comprises steps S102 to S104 as follows:

S102: bearing scheduling information of MBMS controlling signaling (MCCH information) in a designated system information block. wherein the designated system information block is a system information block 2 (SIB2), a system information block 3 (SIB3), or a new added system information block (for example, the block is named as SIB12 or SIBnew, and the present invention uses the SIBnew to describe the new added system information block); moreover, the scheduling information of the controlling signaling here may comprise the scheduling information of a primary and/or secondary MBMS controlling signaling or the scheduling information of an MCCH, the scheduling information comprises information for indicating position of resource which bears the MBMS controlling signaling (MCCH). The position information of the resource comprises information for indicating the position of a subframe bearing the MCCH information, further, the position information of the subframe bearing the MCCH information may be indicated by the setting of an MCCH modification period or MCCH repetition period, i.e., the MCCH modification period or MCCH repetition period is informed to determine the period position of the MCCH information, and then further giving the position of the subframe.

It should be noted that, in the case that the MBMS controlling signaling is not divided in terms of the primary and secondary MBMS controlling signaling, the MBMS controlling signaling is irrespective of the primary and secondary structures, and there is only one MBMS controlling signaling, in addition, because the MBMS controlling signaling is borne on a logical channel MCCH, therefore it is represented as MCCH information. The scheduling information of the primary and/or secondary MBMS controlling signaling may also not be included in the scheduling information of the controlling signaling.

S104: transmitting the designated system information block bearing the scheduling information.

Under the condition that the scheduling information of the primary and/or secondary MBMS controlling signaling or the scheduling information of the MCCH is borne in the SIB2 or the SIB3 or the new added system information block to be transmitted, the scheduling information of the primary and/or secondary controlling signaling or the scheduling information of the MCCH may be borne in the SIB2 or the SIB3 or the new added system information block as an independent Information Element (IE) thereof; or the scheduling information of the primary and/or secondary controlling signaling or the scheduling information of the MCCH, together with MBMS resource configuration information (MBSFN-Subframe Configuration), are borne in the SIB2 as one IE (as prescribed in the LTE protocol, an information list of MBSFN-Subframe Configuration is borne in the SIB2 to be transmitted).

Moreover, the SIB2 or the SIB3 or the new added system information block may be mapped to System Information 2 (SI2) to be transmitted.

Specifically, when the designated system information block is a new added system information block, the new added system information block bears the MBMS information except for an information list of the MBSFN-Subframe Configuration.

In addition, the scheduling information of the new added system information block is included in a system information block 1 and scheduled by the system information block 1.

Meanwhile, when the designated system information block is a new added system information block, a receiver receiving the MBMS service receives the MBMS-based new added system information block.

Device Embodiments

According to an embodiment of the present invention, a transmitting device for scheduling information is provided, which realizes the processing that scheduling information of a primary and/or secondary MBMS controlling signaling or the scheduling information of an MCCH is borne in an SIB2 to be transmitted.

Figure 2:
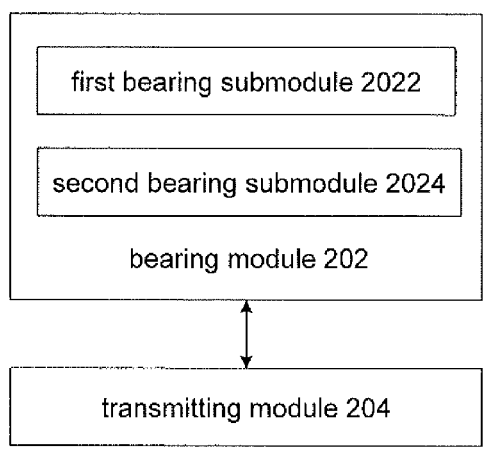
FIG. 2 is a structure block diagram illustrating a transmitting device for scheduling information according to an embodiment of the present invention.

FIG. 2 is a structure block diagram illustrating a transmitting device for scheduling information according to an embodiment of the present invention. As shown in FIG. 2, the transmitting device according to the embodiment of the present invention comprises a bearing module 202 and a transmitting module 204, the modules are described below:

the bearing module 202, which is used for bearing scheduling information of MBMS controlling signaling in a designated system information block to be transmitted, wherein the designated system information block is a system information block 2, a system information block 3, or a new added system information block; and the transmitting module 204, which is used for transmitting the system information block 2 bearing the scheduling information.

Wherein the bearing module 202 may further comprise: a first bearing submodule 2022, which is used for bearing the scheduling information in the designated system information block as an independent information element; and a second bearing submodule, which is used for bearing the scheduling information and MBMS resource configuration information in the designated system information block as one information element.

The device may further comprise: a mapping module (not shown), which is used for mapping the system information block 2 bearing the scheduling information to system information 2.

Wherein the above-mentioned new added system information block may further be used for bearing the information related to the MBMS, wherein the related information comprises at least one of the following: MBMS resource configuration information, indicating information for the MBMS controlling information, MCCH modification period configuration, MCCH repetition period configuration, and MCS adopted by the MCCH information.

In addition, the above-mentioned scheduling information of the controlling signaling is the scheduling information of the primary and/or secondary MBMS controlling signaling or the scheduling information of the MCCH, and the scheduling information comprises information for indicating the position of resource which bears the controlling signaling, and the position information of the resource can be the information of a subframe which bears the controlling signaling.

In addition, the device can also be used for bearing the scheduling information in the SIB3 or SIBnew and transmitting the scheduling information.

In the case that the scheduling information of the primary and/or secondary MBMS controlling signaling or the scheduling information of the MCCH is borne in the SIB3 to be transmitted, it may be borne in the SIB3 as an independent IE thereof; or the scheduling information of the primary and/or secondary controlling signaling, together with MBMS resource configuration information, can be borne in the SIB3 as one IE element.

The processing that the scheduling information of the primary and/or secondary MBMS controlling signaling or the scheduling information of the MCCH is borne in the SIB3 to be transmitted can be implemented by the transmitting device for scheduling information shown in FIG. 2.

In the case that the scheduling information of the primary and/or secondary MBMS controlling signaling is borne in the SIB2 or the SIB3, the SIB2 or the SIB3 for bearing can be configured by a base station. When there is no MBMS service, the information can no longer be configured in the SIB2 or the SIB3.

In addition, in the case that the scheduling information of the primary and/or secondary MBMS controlling signaling or the scheduling information of the MCCH is borne in the new added system information block (SIBnew) to be transmitted, the scheduling information can similarly be borne as an independent IE element in the SIBnew; or the scheduling information together with the MBMS resource configuration signaling can also be borne in the SIBnew as one IE element In addition to the scheduling information of the primary and/or secondary MBMS controlling signaling or the scheduling information of the MCCH, the SIBnew can also bear information related to the MBMS service, the related information comprises at least one of the following: MCCH repetition period information, MCCH modification period information, MBMS resource configuration information, configuration information of indicating information for the MBMS controlling information (which indicates whether controlling signaling of the MBMS service is updated, if the controlling information is updated, a terminal is informed through this information, then the terminal can read the updated controlling information immediately), the information of modulation mode adopted by the MCCH information, and encoding rate information. Preferably, the SIBnew is only used for bearing the information related to the MBMS service.

Wherein the scheduling information of the primary and/or secondary MBMS controlling signaling or the scheduling information of the MCCH, which is borne in the SIBnew, can be configured by a base station, and when there is no MBMS service in a cell, the whole SIBnew will no longer transmit the scheduling information.

Figure 3:
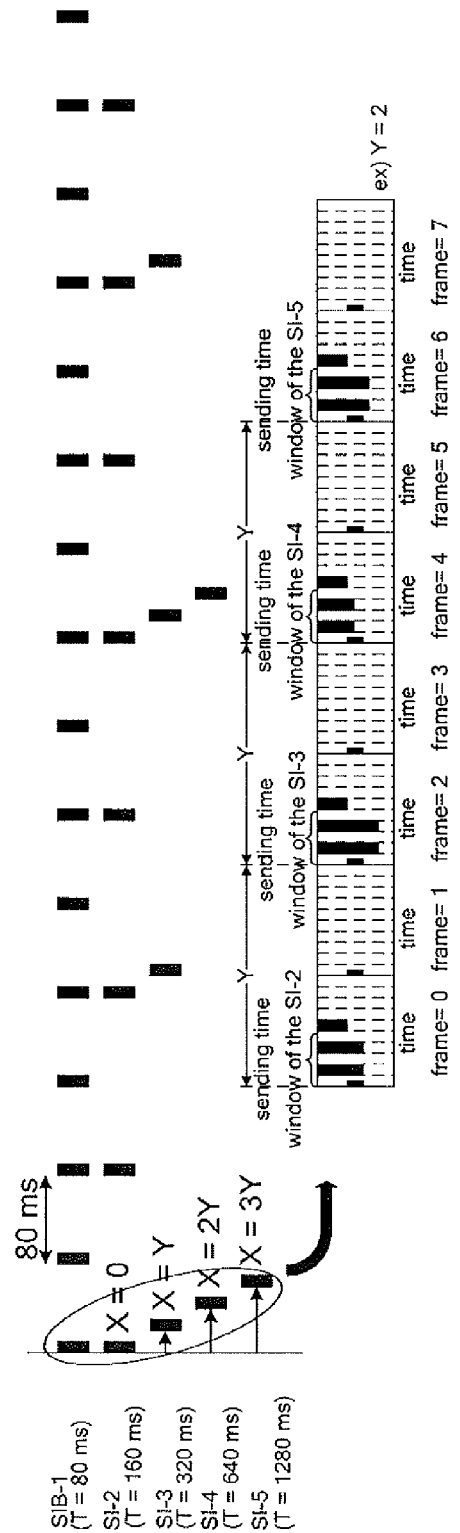
FIG. 3 is a schematic diagram illustrating the SIB transmitting principle in a transmitting method for scheduling information according to an embodiment of the present invention.

After the bearing is completed, when the SIB is being sent, the SIB transmitting principle is as follows:

FIG. 3 is a schematic diagram illustrating the SIB transmitting principle in a transmitting method for scheduling information according to an embodiment of the present invention. As shown in FIG. 3, in the LTE system, there are 11 SIBs, wherein scheduling information of the SIB2-SIB11 is sent in the SIB1, here it is included that the SIB2-SIB11 are respectively scheduled in different SI2-SI5 to be sent, and the starting time of sending is X=0, X=Y, X=2Y, X=3Y respectively. Different SIBs can be configured in one SI. SI sending time windows (SI tx windows) are not allowed to be overlapped with each other, and the width of each window is Y and equals to the length of two radio frames (SFN).

The procedure for receiving MBMS service is that: first, reading the SIB1 to get the scheduling information of the SIB2 from the SIB1, the scheduling information of the SIB2 comprises the information on that SI in which the SIB2 is borne, the terminal receives the SI bearing the SIB2 at a corresponding position according to the scheduling information of the SIB2 in the SIB1, to get the SIB2 so as to obtain resource configuration information of the MBMS service. After the terminal obtains the resource configuration information, the terminal knows which subframes are unicast subframes and which subframes are MBMS service subframe (the subframes bearing MBMS service, which are also referred as MBSFN Subframes). Thus it is beneficial for the terminal to save power, take measurement, and choose to receive MBMS service or avoid receiving MBMS.

The performances of the above three different bearing solutions will be analyzed below.

Solution 1: in the case that the scheduling information is borne in the SIB3, because the SIB3 mainly bears information related to neighbor cells and the scheduling information of the primary and/or secondary MBMS controlling signaling or the scheduling information of the MCCH does not belong to the information of neighbor cells, the types of the borne information are different; in addition, the SIB2 and SIB3 may be scheduled in the same SI to be sent, but in many cases they may not be borne in the same SI to be sent (which is dependent on the scheduling information in the SIB1). If the SIB2 and the SIB3 are not sent in the same SI, after the terminal which is about to receive MBMS receives the SI bearing the SIB2, it gets the MBMS resource configuration information, then the terminal may need to wait for 160 ms to receive the SIB3 on other SIs to obtain the scheduling information of the primary and/or secondary MBMS controlling signaling or the scheduling information of the MCCH.

Solution 2: in the case that the scheduling information is borne in the SIBnew, if the MBMS resource configuration information is borne in the SIB2, the scheduling information of the primary and/or secondary MBMS controlling signaling or the scheduling information of the MCCH is borne in the SIBnew, the SIB2 and SIBnew can be scheduled in different SIs by the SIB1 (here the SIBnew is scheduled and sent by the SIB1, and is similar to other SIBs (such as the SIB2) except for the SIB1, the scheduling information of the SIBnew is included in the SIB1) when scheduled by the system. In this way, for the terminal which does not receive the MBMS service, it can only receive the SI containing the SIB2 rather than the SI containing the SIBnew, so as to avoid receiving the information in the SIBnew. This can reduce the cases that unicast terminals (which are the terminals without ability of receiving MBMS service or the terminals with ability of receiving MBMS service but having no interests in the MBMS service in the present invention) receive information in the SIBnew which the unicast terminal has no interests in (because the unicast terminal does not receive the MBMS service and thus need not receive controlling signaling of MBMS service, the signaling is useful only when received by a receiver which receives the MBMS service), so as to achieve the purpose of saving power. However, for the terminals which receive the MBMS, if the SIB2 and the SIBnew are scheduled in different SIs, the terminals can continue the subsequently receiving only after receiving two SIs. But according to this solution, the unicast terminal receives the SIB2 rather than the SIBnew, thus the unicast terminal gets which subframes transmit MBMS service after obtaining MBSFN-Subframe Configuration (this information is used for configuring the MBSFN subframes) information in the SIB2. Because the unicast terminal does not receive the MBMS service, the data domain of these MBSFN subframes can be directly skipped, which can achieve the purpose of saving power of the unicast terminal. The receiver which receives the MBMS service needs to receive not only the SIB2, but also the SIBnew, so as to get the controlling signaling which is necessary for receiving the MBMS service.

Further, when there is no MBMS service in a cell, the SIBnew can no longer be sent because the SIBnew only bears the information related to the MBMS, which does not influence the unicast terminal, so as to help the system to save resources.

Solution 3: in the case that the scheduling information of the primary and/or secondary controlling signaling or the scheduling information of the MCCH is borne in the SIB2, the terminal which receives the MBMS can also receive the scheduling information of the primary and/or secondary MBMS controlling signaling while receiving the MBMS resource configuration information in the SIB2, this facilitates the terminal to receive MBMS service in time.

Through the above processing, the purpose that the scheduling information of the primary and/or secondary MBMS controlling signaling or the scheduling information of the MCCH, together with MBMS resource configuration information, are borne in one bearer to be transmitted is implemented, a receiving delay in the solution that the scheduling information is borne in the SIB2 to be transmitted is minimized, and compared with the solution that the SIB2 is selected for transmission, the solutions that the SIB3 and the SIBnew are selected for transmission will produce a certain delay.

The receiving process of the scheduling information according to embodiments of the present invention will be described hereinafter respectively by taking the above three bearing modes as example.

Assuming that in the LTE system, the resource configuration information for determining the MBMS service is borne in the SIB2 and is transmitted as one IE element, and the sending period of the SIB2 borne in the SI2 is 160 ms; the system schedules the sending period of the SIB sent in the SI and the sending period of the SI itself through the SIB1; in the time window of the SI2, the terminal obtains specific and detail resources (time and frequency) by monitoring the controlling signaling corresponding to an SI-RNTI in a Physical Downlink Control Channel (PDCCH). The SI-RNTI is a system broadcast except for the MIB, namely the identification of the SIB1 is also the identification of all SI messages.

The receiving processes after the transmission performed through different bearing solutions will be described respectively hereinafter based on the above hypothesis.

EXAMPLE 1

Assuming that there is signaling of the scheduling information of the primary and/or secondary MBMS controlling signaling or the scheduling information of the MCCH, this signaling needs to be encoded according to a specified encoding format; after encoding, it is borne in the SIB2 as an independent IE, or as one IE together with the signaling of MBMS resource configuration information. The SIB1 will take responsible for scheduling the SIB2 into a proper SI (here assuming that the SIB2 is scheduled into the SI2) to be transmitted.

After the terminal receives the system information SIB1, it can know that the SIB2 is scheduled into the SI2 to be transmitted, and also the sending period of the SI2 and the length of the time window can be obtained by the terminal. After the arrival of the sending period of the SI2, the terminal needs to monitor the Radio Network Temporary Identifier (RNTI) in all PDCCHs within the SI2 time window until the terminal detects the System Information RNTI (SI-RNTI) and obtains the corresponding controlling signaling, thus specific position of data sent in the SI2 within the time window can be obtained, so as to obtain the data sent in the SI2. The SIB2 can be obtained after the data is decoded, it can be further obtained that the MBMS resource configuration information, together with scheduling information of the primary and/or secondary MBMS controlling signaling or the scheduling information of the MCCH can further be obtained. Then information of the primary and/or secondary MBMS controlling signaling or the MCCH information is received at the corresponding resource position according to the scheduling information.

EXAMPLE 2

Assuming that there is signaling of the scheduling information of the primary and/or secondary MBMS controlling signaling or the scheduling information of the MCCH, this signaling only needs to be encoded according to a specified encoding format; after encoding, it is borne in the SIB3 as an independent IE. The SIB1 will take responsible for scheduling the SIB3 into a proper SI (here assuming that the SIB3 is scheduled into the SI2) to be transmitted. At this time, when the SIB1 schedules the SIB2 and the SIB3, the SIB2 and the SIB3 should be scheduled into the same SI, which is based on the reason that: the SIB2 bears the MBMS resource configuration information, and the SIB3 bears the signaling of the scheduling information of the primary and/or secondary MBMS controlling signaling or the scheduling information of the MCCH, and sending the SIB2 and the SIB3 in the same SI is beneficial to the terminal which receives the MBMS service to receive at one time, so as to avoid a receiving delay.

After the terminal receives the system information SIB1, it can know that the SIB3 is scheduled into the SI2 to be transmitted, and also the sending period of the SI2 and the length of the time window can be obtained by the terminal. After the arrival of the sending period of the SI2, the terminal needs to monitor the RNTI in all PDCCHs within the SI2 time window until the terminal detects the SI-RNTI and obtains the corresponding controlling signaling, thus specific position of data sent in the SI2 within the time window can be obtained, so as to obtain the data sent in the SI2. The SIBS can be obtained after the data is decoded, and the MBMS resource configuration information, together with scheduling information of the primary and/or secondary MBMS controlling signaling or the scheduling information of the MCCH can further be obtained. Then information of the primary and/or secondary MBMS controlling signaling or the MCCH information is received at the corresponding resource position according to the scheduling information.

EXAMPLE 3

Assuming that there is signaling of the scheduling information of the primary and/or secondary MBMS controlling signaling or the scheduling information of the MCCH, this signaling only needs to be encoded according to a specified encoding format; after encoding, it is borne in the SIBnew as an independent IE. The SIB1 will take responsible for scheduling the SIBnew into a proper SI (here assuming that the SIBnew is scheduled into the SI2) to be transmitted. Similar to other SIBs (except for the SIB1, such as the SIB2), the scheduling information of the SIBnew is included in the SIB1. Here when the SIB1 is scheduling the SIB2 and the SIBnew, the SIB2 and the SIBnew can be scheduled into the same SI, which is based on the reason that: the SIB2 bears the MBMS resource configuration information, and the SIBnew bears the scheduling information of the primary and/or secondary MBMS controlling signaling or the scheduling information of the MCCH, and sending the SIB2 and the SIBnew in the same SI is beneficial to the terminal which receives the MBMS service to receive at one time, so as to avoid a receiving delay. However, if the SIB2 and the SIBnew are scheduled in the same SI, it is not beneficial for the unicast receiver to save power, because the unicast terminal does not want to receive the SIBnew which is useless for the unicast terminal. Therefore the SIB2 and the SIBnew can be scheduled in different SIs respectively, which is beneficial for the unicast terminal to save power, but not beneficial for the receiver of the MBMS service to receive the MBMS service immediately. In a word, if the receiver of the MBMS service can tolerate a certain delay, the SIB2 and the SIBnew are scheduled in different SIs respectively.

After the terminal receives the system information SIB1, it can be know that the SIBnew is scheduled into the SI2 to be transmitted, and also the sending period of the SI2 and the length of the time window can be obtained by the terminal. After the arrival of the sending period of the SI2, the terminal needs to monitor the RNTI in all PDCCHs within the SI2 time window until the terminal detects the SI-RNTI and obtains the corresponding controlling signaling, thus specific position of data sent in the SI2 within the time window can be obtained, so as to obtain the data sent in the SI2. The SIBnew can be obtained after the data is decoded, and the MBMS resource configuration information, together with the scheduling information of the primary and/or secondary MBMS controlling signaling or the scheduling information of the MCCH can further be obtained. Then the information of the primary and/or secondary MBMS controlling signaling or the MCCH information is received at the corresponding resource position according to the scheduling information.

In a word, by means of the technical solutions of the present invention, a proper bearer is selected according to the characteristics of bearers on a BCCH, to bear the scheduling information of a primary and/or secondary MBMS controlling signaling or the scheduling information of an MCCH, which fills the gap of the manner of selecting a bearer in related technologies, implements the configuration and sending of the scheduling information, reduces the receiving delay and the resource consume when data is transmitted, thus making the transmitting manner of the data more adapted to the receiving process of the MBMS service.

The above description is just preferable embodiments of the present invention, and not used to limit the present invention, to those skilled in the art, various modifications and changes can be made based on the present invention. Therefore any modification, equivalent substitute and improvement within the spirit and principle of the present invention shall be included in the protection scope of the present invention.

What is claimed is:

1. A transmitting method for scheduling information in a Long Term Evolution (LTE) system, which is used for transmitting scheduling information of Multimedia Broadcast Multicast Service (MBMS) controlling signaling, comprising:

bearing the scheduling information of MBMS controlling signaling in a designated system information block (SIB) to be transmitted to a receiver, wherein the designated SIB is a new added SIB based on SIB1~SIB11, wherein the new added SIB includes scheduling information of a Multicast Control Channel (MCCH), and the scheduling information of the MCCH includes information for indicating a position of a subframe which bears the MCCH, and wherein the new added SIB further includes MCCH repetition period information, MCCH modification period information, information of modulation mode adopted by MCCH and wherein the information for indicating a position of a subframe which bears the MCCH is indicated by setting the MCCH repetition period information or the MCCH modification period information;

scheduling, in the SIB1, the new added SIB, such that the scheduling information of the new added SIB is included in SIB1, wherein the scheduling comprises:
allocating system information (SI)for the new added SIB, and configuring
a sending period and a length of a sending time window corresponding to the SI;

receiving by the receiver, the SIB1 to acquire the sending period and the length of the sending time window of the SI;

monitoring, after the arrival of the sending period of the SI, by the receiver, Physical Downlink Control Channels (PDCCHs) of all the subframes within the sending time window for a subframe corresponding to System Information Radio Network Temporary Identifier (SI-RNTI) and obtaining the controlling signaling from the subframe corresponding to the SI-RNTI;

obtaining, by the receiver, the new added SIB based on the controlling signaling;

obtaining, by the receiver, the scheduling information of the MCCH from the new added SIB:

receiving, by the receiver, the MCCH information in a corresponding subframe based on the scheduling information of the MCCH.

2. The method according to claim 1, wherein the new added system information block is no longer sent in a cell if there are no MBMS services in the cell.

3. The method according to claim 1, wherein the new added system information block and a system information block 2 are scheduled in a same System Information (SI) sending time window or different SI sending time windows to be sent.

4. The method according to claim 1, wherein the new added system information block bears MBMS information except for an information list of MBSFN-Subframe Configuration.

5. A transmitting device for scheduling information in long Term Evolution (LTE) system, which is used for transmitting the scheduling information of MBMS controlling signaling, comprising:

a bearing module, which is used for bearing scheduling information of MBMS controlling signaling in a designated system information block to be transmitted to a receiver, wherein the designated SIB is a new added SIB based on SIB1~SIB11; and a transmitting module, which is used for transmitting the new added SIB which bears the scheduling information, wherein the scheduling information of the MBMS controlling signaling includes scheduling information of a Multicast Control Channel (MCCH), and the scheduling information of the MCCH comprises information for indicating a position of a subframe which bears the MCCH, and wherein the new added SIB further includes MCCH repetition period information, MCCH modification period information, information of modulation mode adopted by an MCCH, and the information for indicating a position of a subframe which bears the MCCH is indicated by setting the MCCH repetition period information or the MCCH modification period information;

and the new added SIB is scheduled by the SIB1 and the scheduling information of the new added SIB is added in the SIB1.

6. The device according to claim 5, wherein the new added system information block is no longer sent in a cell if there are no MBMS services in the cell.

7. The device according to claim 5, wherein the new added system information block and a system information block 2 are scheduled in the same System Information (SI) sending time window or different SI sending time windows to be sent.

8. The device according to claim 5, wherein the new added system information block bears MBMS information except for an information list of MBSFN-Subframe Configuration.

* * * * *